United States Patent
Reidlinger

(10) Patent No.: US 8,957,128 B2
(45) Date of Patent: Feb. 17, 2015

(54) URETHANE MODIFIED WATER-REDUCIBLE ALKYD RESIN COMPOSITIONS

(75) Inventor: Gerhard Reidlinger, Graz (AT)

(73) Assignee: Allnex Austria GmbH (AT)

( * ) Notice: Subject to any disclaimer, the term of this patent is extended or adjusted under 35 U.S.C. 154(b) by 85 days.

(21) Appl. No.: 13/811,817

(22) PCT Filed: Jul. 24, 2011

(86) PCT No.: PCT/EP2011/062696
§ 371 (c)(1),
(2), (4) Date: Mar. 20, 2013

(87) PCT Pub. No.: WO2012/013612
PCT Pub. Date: Feb. 2, 2012

(65) Prior Publication Data
US 2013/0178556 A1    Jul. 11, 2013

(30) Foreign Application Priority Data
Jul. 24, 2010 (EP) .................... 10170724

(51) Int. Cl.
| | | |
|---|---|---|
| *C09D 151/08* | (2006.01) | |
| *C08G 18/63* | (2006.01) | |
| *C08G 18/75* | (2006.01) | |
| *C09D 175/04* | (2006.01) | |
| *C08G 18/32* | (2006.01) | |
| *C08G 18/36* | (2006.01) | |
| *C08G 18/40* | (2006.01) | |

(52) U.S. Cl.
CPC ............. *C09D 151/08* (2013.01); *C08G 18/63* (2013.01); *C08G 18/755* (2013.01); *C09D 175/04* (2013.01); *C08G 18/3206* (2013.01); *C08G 18/36* (2013.01); *C08G 18/4072* (2013.01)
USPC .......................................... 523/122; 524/599

(58) Field of Classification Search
USPC .......................................... 523/122; 524/599
See application file for complete search history.

(56) References Cited

U.S. PATENT DOCUMENTS

| 5,698,625 A | 12/1997 | Billiani et al. |
| 6,489,398 B1 | 12/2002 | Zuckert et al. |
| 2004/0101639 A1 | 5/2004 | Hann et al. |
| 2005/0042379 A1 * | 2/2005 | Oostveen et al. .......... 427/372.2 |

FOREIGN PATENT DOCUMENTS

| EP | 0267562 A2 | 5/1988 |
| EP | 0295403 A2 | 12/1988 |
| EP | 0 437 743 A2 | 7/1991 |
| GB | 2100271 A | 12/1982 |
| WO | WO-9527762 A1 | 10/1995 |
| WO | WO-2006092211 A1 | 9/2006 |

OTHER PUBLICATIONS

International Search Report for PCT/EP2011/062696 mailed Oct. 28, 2011.

* cited by examiner

*Primary Examiner* — Nathan M Nutter
(74) *Attorney, Agent, or Firm* — Drinker Biddle & Reath LLP

(57) ABSTRACT

The invention is directed to an aqueous coating composition comprising a combination of a high molar mass urethane-modified alkyd resin A and a reactive diluent D, characterized in that the alkyd resin A has moieties derived from grafted fatty acids A1 which are graft products of fatty acids A11 having at least one olefinic unsaturation, on average, per molecule, and olefinically unsaturated linear or branched aliphatic acids A12 preferably having from three to ten carbon atoms, polyhydric aliphatic alcohols A2, fatty acids A3, polyfunctional isocyanates A4, and the reactive diluent D has a hydroxyl number of at most 5 mg/g, and comprises moieties derived from olefinically unsaturated fatty acids D1, and polyoxyalkylene glycols D2 or their monoethers, to a process of preparation thereof, and a method of use thereof for coating of wood, fiberboard, textiles, paper, cardboard, leather, and thermoplastic materials.

15 Claims, No Drawings

URETHANE MODIFIED WATER-REDUCIBLE ALKYD RESIN COMPOSITIONS

CROSS-REFERENCE TO RELATED APPLICATIONS

This application is a national stage application (under 35 U.S.C. §371) of PCT/EP2011/062696, filed Jul. 24, 2011, which claims benefit of European application 10170724.8, filed Jul. 24, 2010 which are both incorporated by reference.

FIELD OF THE INVENTION

The present invention relates to coating compositions comprising urethane modified water-reducible alkyd resins, a process for their preparation, and a method of use thereof.

BACKGROUND OF THE INVENTION

Alkyd resins may be rendered water-reducible by grafting with olefinically unsaturated carboxylic acids, especially alpha-unsaturated carboxylic acids like methacrylic acid or by co-condensation with polycarboxylic acids such as tetrahydrophthalic acid or hydroxycarboxylic acids having acid groups which do not react, or only react to a small extent, under polycondensation conditions by esterification, yet impart hydrophilicity after being neutralised with alkaline compounds to provide a sufficient number of anionic groups in the resin molecules.

Water-reducible alkyd resins where fatty acids bearing grafts derived from acrylic monomers have been known, i. a. from EP 0 267 562 A2, EP 0 295 403 A2, EP 0 437 743 A2, WO 1995/027 762 A1, and WO 2006/092211 A1.

Efficient surface protection, particularly for flexible or deformable substrates such as plastic or wood parts, needs high molar mass resins which provide the needed combination of elasticity, hardness, weathering and chemical resistance. As high molar mass resins exhibit high viscosity in melt or solution, they cannot easily be made as also the reaction rate decreases with increasing viscosity. While the viscosity can be reduced by addition of a solvent, this solvent would have to be removed before or preferably after formation of the resin dispersion.

SUMMARY OF THE INVENTION

It is therefore an object of the invention to provide an aqueous dispersion of a high molar mass water-reducible urethane-modified alkyd resin that is simple to make, and that provides a good balance of elasticity, hardness, as well as weathering and chemical resistances.

This problem has been solved by an aqueously dispersible alkyd resin which comprises a combination of a high molar mass alkyd resin and a reactive diluent.

One object of the invention is therefore an aqueous coating composition comprising a combination of a high molar mass urethane-modified alkyd resin A and a reactive diluent D.

The alkyd resin A has moieties derived from grafted fatty acids A1, polyhydric aliphatic alcohols A2, fatty acids A3, polyfunctional isocyanates A4, and optionally, also polybasic organic acids A5. The polyhydric aliphatic alcohols A2 and the fatty acids A3 may be partially or totally replaced by transesterification products of oils A6 and polyhydric aliphatic alcohols A2' which may be the same as, or be different from, the polyhydric aliphatic alcohols A2, but are selected from the same group of compounds. The grafted fatty acids A1 are graft products of fatty acids A11 having at least one olefinic unsaturation, on average, per molecule, and olefinically unsaturated linear or preferably branched aliphatic acids A12 preferably having from three to ten carbon atoms, wherein these olefinically unsaturated linear or preferably branched aliphatic acids A12 can optionally be mixed with further olefinically unsaturated monomers as detailed infra.

The reactive diluent D is an ester of an acid component which comprises at least one of aliphatic or aromatic di- or polycarboxylic acids D3 or their anhydrides, and of olefinically unsaturated fatty acids D1 which may optionally be grafted with olefinically unsaturated monomers D11 including at least one of an olefinically unsaturated monocarboxylic acid D111, and an olefinically unsaturated dicarboxylic acid anhydride D112, and optionally, further olefinically unsaturated monomers D113, and of a hydroxy-functional component which may be water or a monohydric alcohol D5 and also, polyoxyalkylene glycols D2 or their monoethers, and optionally, polyhydric aliphatic alcohols D4 having at least two hydroxyl groups. Instead of, or together with, the olefinically unsaturated fatty acids D1, it is also possible to use esters thereof with the said polyhydric aliphatic alcohols D4 having at least two hydroxyl groups. In this invention, it is essential that the reactive diluent D has a hydroxyl number of at most 5 mg/g, preferred not more than 3 mg/g, and particularly preferred, not more than 2 mg/g.

A further object of the invention is a process to make an aqueous coating composition comprising a combination of a high molar mass urethane-modified alkyd resin A and a reactive diluent D.

The alkyd resin A is made by a stepwise process comprising, in the first step, grafting fatty acids A11 having at least one olefinic unsaturation, on average, per molecule, with olefinically unsaturated linear or preferably branched aliphatic acids A12 preferably having from three to ten carbon atoms, in the second step, subjecting the grafted fatty acids A1 of the first step to an esterification reaction together with polyhydric aliphatic alcohols A2, fatty acids A3, polyfunctional isocyanates A4, and optionally, also polybasic organic acids A5, and in the third step, mixing the alkyd resin A made in the second step with a reactive diluent D which is made in a separate step by esterification of an acid component comprising at least one of aliphatic or aromatic di- or polycarboxylic acids D3 or their anhydrides, and of olefinically unsaturated fatty acids D1 which may optionally be grafted with olefinically unsaturated monomers D11 including at least one of an olefinically unsaturated monocarboxylic acid D111, and an olefinically unsaturated dicarboxylic acid anhydride D112, and optionally, further olefinically unsaturated monomers D113, and of a hydroxy-functional component which comprises polyoxyalkylene glycols D2 or their monoethers, and optionally, one or more of monohydric alcohols D5, and polyhydric aliphatic alcohols D4 having at least two hydroxyl groups.

It is also possible to use a transesterification product of natural or modified oils A6 which are esters of glycerol with fatty acids which may be modified by, e.g., hydrogenation, with grafted fatty acids A1, and optionally, at least one of polyhydric alcohols A2, fatty acids A3, polybasic organic acids A5, which is thereafter reacted with polyfunctional isocyanates A4.

In a preferred embodiment, the reaction with polyfunctional isocyanates A4, and optionally, polybasic organic acids A5, is made after addition of the reactive diluent D.

Instead of, or together with, the olefinically unsaturated fatty acids D1, it is also possible to use esters thereof with the said polyhydric aliphatic alcohols D4 having at least two hydroxyl groups. The kind and amounts of the starting materials, or educts, of the reactive diluent D are chosen in a way that the hydroxyl number of the reactive diluent D is at most 5 mg/g, preferably not more than 3 mg/g, and particularly preferably, not more than 2 mg/g.

A still further object of the present invention is a method of use of the aqueous coating composition comprising a combination of a high molar mass urethane-modified alkyd resin A and a reactive diluent D as defined supra comprising adding a siccative S, and optionally, at least one of additives selected from the group consisting of dispersing agents, flow and levelling agents, wetting agents, antisettling agents, biocides, UV absorbers, pigments, and fillers, and applying the aqueous coating composition to a substrate which may be wood, both as native and industrial wood, fibreboard, textiles, paper, cardboard, and thermoplastic materials.

DETAILED DESCRIPTION OF THE PREFERRED EMBODIMENTS

The alkyd resin A preferably has an acid number of from 20 mg/g to 120 mg/g, particularly preferably of from 25 mg/g to 110 mg/g, and especially preferred, from 30 mg/g to 100 mg/g. The content of urethane groups, expressed as mass fraction of urethane groups, —NH—CO—O—, with a molar mass M=59.02 g/mol, in the resin is preferably from 0.1% to 10%, particularly preferably from 0.3% to 9%, and especially preferred, from 0.5% to 8%. The aqueous dispersion of the alkyd resin A preferably has a mass fraction of solids of from 30% to 60%, particularly preferably from 32% to 58%, and especially preferred from 35% to 55%. Its average particle size (as measured with laser diffraction, and reported as $d_v(50)$ which is the median of the diameter of equivalent volume spheres) is preferably between 40 nm and 200 nm, particularly preferably from 45 nm to 190 nm, and especially preferred from 50 nm to 180 nm. Compared to those resins as disclosed in WO 2006/092 211 A1 which can be synthesised with a maximum of the Staudinger index of 12 $cm^3/g$, the urethane alkyd of this invention can be synthesised up to a Staudinger index of 30 $cm^3/g$.

The grafted fatty acids A1 are graft products of fatty acids A11 having at least one olefinic unsaturation, on average, per molecule, and olefinically unsaturated linear or preferably branched aliphatic acids A12 preferably having from three to ten carbon atoms. The fatty acids A11 preferably have from 6 to 30 carbon atoms and have at least one olefinic double bond in their molecules. Useful fatty acids include, but are not limited to, palmitoleid acid, oleic and elaidic acids, gadoleic acid, erucic acid, sorbic acid, linolic acid, linolenic acid, eleostearic acid, arachidonic acid, and clupanodonic acid, as well as their mixtures, particularly those mixtures that are made from natural oils such as cottonseed oil, linseed oil, palm oil, rapeseed oil, safflower oil, soybean oil, and sunflower oil. These latter mixtures of fatty acids are referred to as cottonseed oil fatty acids, linseed oil fatty acids, palm oil fatty acids, rapeseed oil fatty acids, safflower oil fatty acids, soybean oil fatty acids, and sunflower oil fatty acids.

The olefinically unsaturated linear or preferably branched aliphatic acids A12 have at least one, preferably one, carboxyl group and at least one, preferably one, olefinic unsaturation, and they are preferably branched. It is particularly preferred that the carbon atom to which the carboxyl group is bound carries a bulky substituent such as a methyl, ethyl or propyl group such as in methacrylic acid, ethacrylic acid, 2-propylacrylic acid, and 2,3-dimethylacrylic (tiglic) acid.

In the grafting step, in addition to the acids A12, other olefinically unsaturated monomers A13 capable of radical copolymerisation may also be grafted onto the fatty acids A11, selected from the group consisting of monoesters A131 of aliphatic alcohols and olefinically unsaturated dicarboxylic acids such as monomethyl maleinate, esters A132 of aliphatic alcohols and olefinically unsaturated carboxylic acids where in addition to the branched aliphatic unsaturated acids A12, also linear aliphatic unsaturated acids such as acrylic acid, vinyl acetic acid, crotonic and isocrotonic acid may be used to for the esters A132, such as methyl(meth)acrylate, ethyl(meth)acrylate, isobutyl(meth)acrylate, and 2-ethylhexyl(meth)acrylate, as well as diesters of olefinically unsaturated dicarboxylic acids such as dimethyl maleinate, hydroxy functional esters A133 of di- and polyhydric alcohols and the olefinically unsaturated carboxylic acids mentioned supra, such as hydroxyethyl(meth)acrylate and hydroxypropyl(meth)acrylate, and aromatic vinyl compounds A134 such as styrene, p-methylstyrene and vinyl toluene, and other copolymerisable vinyl compounds A135 such as vinyl acetate, vinyl chloride, methyl vinyl ketone, methyl vinyl and allyl ethers, and (meth)acrylonitrile.

The polyhydric aliphatic alcohols A2 and A2' are preferably linear or branched alcohols having from 2 to 12 carbon atoms and at least two hydroxyl groups. Preferred alcohols are ethylene glycol, 1,2- and 1,3-propylene glycol, 1,4-butane diol, 1,6-hexane diol, neopentyl glycol, 2,2,4-trimethylpentane-1,3-diol, glycerol, trimethylol ethane, trimethylol propane, diglycerol, ditrimethylol ethane and ditrimethylol propane, erythritol, pentaerythritol, dipentaerythritol and sugar alcohols such as sorbitol, mannitol, and arabitol.

The fatty acids A3 may be saturated or unsaturated, or may be mixtures of saturated fatty acids, of unsaturated fatty acids, and of saturated and unsaturated fatty acids. They preferably have from 6 to 30 carbon atoms. Useful fatty acids are particularly lauric, myristic, palmitic, margaric, stearic, arachidic, behenic, lignoceric, hexacosanoic, triacontanoic, palmitoleic, oleic, erucic, sorbic, linoleic, linolenic, eleostearic, arachidonic, and clupanodonic acids, as well as mixtures of fatty acids derived from natural oils, particularly cottonseed oil fatty acids, linseed oil fatty acids, palm oil fatty acids, rapeseed oil fatty acids, rubber seed oil fatty acids, safflower oil fatty acids, soybean oil fatty acids, sunflower oil fatty acids, and tall oil fatty acids.

The polyfunctional isocyanates A4 are preferably selected from aromatic and aliphatic isocyanates, preferably diisocyanates, such as toluylene diisocyanate (TDI), bis-(4-isocyanatophenyl) methane (MDI), bis-(4-isocyanatocyclohexyl) methane (HMDI), tetramethyl-m-xylylene diisocyanate (TMXDI), 1,6-diisocyanatohexane (HDI), and isophorone diisocyanate (IPDI). Mixtures of these may also be used.

The oils A6 are natural oils which can be liquid vegetable oils such as almond oil, avocado oil, castor oil, corn germ oil, cottonseed oil, grapeseed oil, linseed oil, oiticica oil, olive oil, peanut oil, pumpkinseed oil, rapeseed oil, ricebran oil, safflower oil, sesame oil, soybean oil, sunflower oil, tung oil, and wheat germ oil, and also marine oils such as herring oil, Japanese fish oil, menhaden oil, Scandinavian fish oil, South American fish oil, and whale oil. Other oils which can be used are isomerised oils based on one or more of the natural oils mentioned supra, refined natural oils which have been subjected to one or more of degumming, deacidising, bleaching, dewaxing, and deodourisation. Further useful oils are boiled oils which have been subjected to heating in the presence of siccatives and optionally, air, stand oils which have been subjected to heating in the absence of oxygen, wherein isomerisation, polymerisation, and transesterification occur, blown oils where air is bubbled through an oil at a temperature of from 90° C. to 120° C., and hydroperoxides are formed which decompose into radicals which in turn catalyse formation of larger molecules, and isomerised oils where oils are treated with basic catalysts at 100° C. to 140° C. to increase the number of conjugated double bonds and to convert cis to trans forms.

The reactive diluent D comprises olefinically unsaturated fatty acids D1 which may optionally be partially or completely replaced by fatty acids D1' made from olefinically unsaturated fatty acids D1 which may optionally be grafted with olefinically unsaturated monomers D11 including at least one of an olefinically unsaturated monocarboxylic acid D111, and an olefinically unsaturated dicarboxylic acid anhydride D112, and optionally, further olefinically unsaturated monomers D113. In one preferred embodiment the reactive diluent D is an esterification product of the said olefinically unsaturated fatty acids D1 and polyoxyalkylene glycols D2 or their monoethers D2' which are monoethers of polyoxyalkylene glycols D2 with linear or branched aliphatic alcohols D21 having from one to eight carbon atoms and one hydroxyl group, optionally, aliphatic or aromatic di- or polycarboxylic acids D3 or their anhydrides, and further optionally, polyhydric aliphatic alcohols D4 having at least two hydroxyl groups. Instead of, or together with, the olefinically unsaturated fatty acids D1, it is also possible to use esters thereof with the said polyhydric aliphatic alcohols D4 having at least two hydroxyl groups. Together with, or instead of, the polyoxyalkylene glycols D2 or their monoethers D2', it is also possible to use other hydroxyl-functional compounds, which preferably also contribute to water-dispersibility or water-solubility of the final product, D. Such other products can be hydroxy acids with at least one hydroxyl group, such as dimethylol acetic acid, dimethylol propionic acid, and dimethylol butyric acid, acid and hydroxyl functional acrylate oligomers, or oligomeric esters of polyfunctional alcohols and polyfunctional acids.

It is preferred that the reactive diluent D itself is water-soluble or water-dispersible. Therefore, either or both of moieties derived from polyoxyalkylene glycols, and of acids are preferably present in the reactive diluents D. Presence of moieties derived from drying fatty acids (fatty acids having olefinic unsaturation) is needed to provide co-reactivity with the urethane alkyd resin A. On the other hand, little or no reactivity towards the isocyanate makes sure that the reactive diluent D remains separate during formation of the urethane, and does not react at an early stage with the urethane alkyd resin A to be able to fulfil its role as solvent, or diluent, and to reduce the overall viscosity of the combination. Various possibilities to realise these two properties: hydrophilicity and drying behaviour, are detailed infra. A further advantage of having the reactive diluent D present in the composition is that this low molar mass component shows good penetration properties in porous substrates, and thus provides good wetting properties, and enhanced drying of the part of the composition (the urethane alkyd resin A) that does not penetrate but remains at the surface. This improves protection of the surface of the substrate.

In one preferred embodiment, the reactive diluent D comprises moieties derived from an olefinically unsaturated fatty acid D1, and from a polyoxyalkylene glycol D2 to provide a hydroxy-functional ester of a polyoxyalkylene glycol with an olefinically unsaturated fatty acid. The moieties D1 may also be derived from drying oils, i. e. esters of glycerol and fatty acids D1. These reactive diluents are made by esterification of at least one fatty acid D1 and at least one polyoxyalkylene glycol D2, or by transesterification of a drying oil (which as at least one fatty acid constituent according to D1), and at least one polyoxyalkylene glycol D2.

In a second preferred embodiment, the reactive diluent D comprises moieties derived from an olefinically unsaturated fatty acid D1 and from a monoether D2' of a polyoxyalkylene glycol D2 to provide an essentially non-functional mono-etherified monoester of a polyoxyalkylene glycol with an olefinically unsaturated fatty acid. The moieties D1 may also be derived from drying oils, i. e. esters of glycerol and fatty acids D1. These reactive diluents are made by esterification of at least one fatty acid D1 and at least one monoether D2' of a polyoxyalkylene glycol D2, or by transesterification of a drying oil (which as at least one fatty acid constituent according to D1), and at least one monoether D2' of a polyoxyalkylene glycol D2.

In a third preferred embodiment, the reactive diluent D comprises moieties derived from a grafted olefinically unsaturated fatty acid D1' which is an olefinically unsaturated fatty acid D1 grafted with at least one olefinically unsaturated monomer, at least one of these being a, olefinically unsaturated dicarboxylic acid anhydride D11, and from a polyoxyalkylene glycol D2. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a fourth preferred embodiment, the reactive diluent D comprises moieties derived from an olefinically unsaturated fatty acid D1' which is an olefinically unsaturated fatty acid D1 grafted with at least one olefinically unsaturated monomer D11, at least one of these being a, olefinically unsaturated dicarboxylic acid anhydride D112, and from a monoether D2' of a polyoxyalkylene glycol D2. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a fifth preferred embodiment, the reactive diluent D comprises moieties derived from a polyoxyalkylene glycol D2 and from an olefinically unsaturated fatty acid D1, and further, from aliphatic or aromatic di- or polycarboxylic acids D3 or their anhydrides. The moieties D1 may also be derived from drying oils, i. e. esters of glycerol and fatty acids D1. These reactive diluents are made by esterification of at least one fatty acid D1, at least one polyoxyalkylene glycol D2, and further, from aliphatic or aromatic di- or polycarboxylic acids D3 or their anhydrides, or by transesterification of a drying oil (which has at least one fatty acid constituent according to D1), at least one monoether D2' of a polyoxyalkylene glycol D2, and further, from aliphatic or aromatic di- or polycarboxylic acids D3 or their anhydrides.

In a sixth preferred embodiment, the reactive diluent D comprises moieties derived from a hydroxy functional monoester of a polyoxyalkylene glycol D2 and from an olefinically unsaturated fatty acid D1, and further, from aliphatic or aromatic di- or polycarboxylic acids D3 or their anhydrides and from polyhydric aliphatic alcohols D4 having at least two hydroxyl groups. The moieties D1 may also be derived from drying oils, i. e. esters of glycerol and fatty acids Dl. These reactive diluents are made by esterification of at least one fatty acid D1, at least one polyoxyalkylene glycol D2, from aliphatic or aromatic di- or polycarboxylic acids D3 or their anhydrides, and from polyhydric aliphatic alcohols D4 having at least two hydroxyl groups, or by transesterification of a drying oil (which as at least one fatty acid constituent according to D1), at least one polyoxyalkylene glycol D2, from aliphatic or aromatic di- or polycarboxylic acids D3 or their anhydrides, and from polyhydric aliphatic alcohols D4 having at least two hydroxyl groups.

In a seventh preferred embodiment, the reactive diluent D comprises moieties derived from a monoether D2' of a polyoxyalkylene glycol and from an olefinically unsaturated fatty acid D1, and further, from aliphatic or aromatic di- or polycarboxylic acids D3 or their anhydrides and from polyhydric aliphatic alcohols D4 having at least two hydroxyl groups. The moieties D1 may also be derived from drying oils, i. e. esters of glycerol and fatty acids D1. These reactive diluents are made by esterification of at least one fatty acid D1, a monoether D2' of a polyoxyalkylene glycol D2, from aliphatic or aromatic di- or polycarboxylic acids D3 or their anhydrides, and from polyhydric aliphatic alcohols D4 having at least two hydroxyl groups, or by transesterification of a drying oil (which as at least one fatty acid constituent according to D1), a monoether D2' of a polyoxyalkylene glycol D2, aliphatic or aromatic di- or polycarboxylic acids D3 or their anhydrides, and polyhydric aliphatic alcohols D4 having at least two hydroxyl groups.

In an eighth preferred embodiment, the reactive diluent D comprises moieties derived from grafted fatty acids D1' made from fatty acids D1 which are grafted with at least one olefinically unsaturated monomer D11, at least one of these being an olefinically unsaturated dicarboxylic acid anhydride D112, from polyoxyalkylene glycols D2, and from aliphatic or aromatic di- or polycarboxylic acids D3 or their anhydrides. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a ninth preferred embodiment, the reactive diluent D comprises moieties derived from grafted fatty acids D1' made from fatty acids D1 which are grafted with at least one olefinically unsaturated monomer D11, at least one of these being an olefinically unsaturated dicarboxylic acid anhydride D112, from a monoether D2' of a polyoxyalkylene glycol, and from aliphatic or aromatic di- or polycarboxylic acids D3 or their anhydrides. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a tenth preferred embodiment, the reactive diluent D comprises moieties derived from grafted fatty acids D1' made from fatty acids D1 or esters thereof with polyhydric aliphatic alcohols D4 having at least two hydroxyl groups, grafted with at least one olefinically unsaturated monomer D11, at least one of these being an olefinically unsaturated dicarboxylic acid anhydride D112, polyoxyalkylene glycols D2, and polyhydric aliphatic alcohols D4 having at least two hydroxyl groups. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In an eleventh preferred embodiment, an ester is made from fatty acids D1' made from fatty acids D1 grafted with at least one olefinically unsaturated monomer D11, at least one of these being an olefinically unsaturated dicarboxylic acid anhydride D112, a monoether D2' of a polyoxyalkylene glycol, and polyhydric aliphatic alcohols D4 having at least two hydroxyl groups. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a twelfth preferred embodiment, an ester is made from fatty acids D1' made from fatty acids D1 grafted with at least one olefinically unsaturated monomer D11, at least one of these being an olefinically unsaturated dicarboxylic acid anhydride D112, polyoxyalkylene glycols D2, aliphatic or aromatic di- or polycarboxylic acids D3 or their anhydrides, and polyhydric aliphatic alcohols D4 having at least two hydroxyl groups. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a thirteenth preferred embodiment, an ester is made from fatty acids D1' made from fatty acids D1 grafted with at least one olefinically unsaturated monomer D11, at least one of these being an olefinically unsaturated dicarboxylic acid anhydride D112, a monoether D2' of a polyoxyalkylene glycol, aliphatic or aromatic di- or polycarboxylic acids D3 or their anhydrides, and polyhydric aliphatic alcohols D4 having at least two hydroxyl groups. The moieties D1' may also be derived from drying oils, i. e. esters of glycerol and fatty acids D1 which are grafted with at least one olefinically unsaturated monomer D11, at least one of these being an olefinically unsaturated dicarboxylic acid anhydride D112.

In a fourteenth preferred embodiment, an ester is made from fatty acids D1 and dihydric aliphatic linear or branched alcohols, which is then grafted with olefinically unsaturated dicarboxylic acid anhydrides, preferably maleic or tetrahydrophthalic acids, followed by ring-opening with water or aliphatic alcohols having at least one hydroxyl group per molecule.

The fatty acids D1 may be selected from the same group as the fatty acids A11 supra, the grafted fatty acids D1' may be selected from the same group as the grafted fatty acids A1 supra, with the proviso that also unsaturated dicarboxylic acids such as maleic, fumaric, itaconic, mesaconic and citraconic acids including anhydrides thereof in case they exist, are useful as monomers A13. The olefinically unsaturated monomers D11 used in the grafting step comprise at least one olefinically unsaturated dicarboxylic acid D112, but may also additionally comprise any of the olefinically unsaturated monomers A13 as defined supra.

The polyoxyalkylene glycols D2 have a number average molar mass of from 200 g/mol to 10 kg/mol, and have from 2 to 4 carbon atoms in the alkylene group, where it is preferred that mass fraction of at least 60%, more preferred of at least 70%, and particularly preferred, of at least 80% of the alkylene groups is an ethylene group. Most preferred are polyoxyethylene glycols.

The aliphatic or aromatic dicarboxylic or polycarboxylic acids D3 have two or more, preferably up to four, carboxylic acid groups, and may also have further functional groups, preferably, hydroxyl groups, or sulphonic acid groups, or both. Useful acids are malonic acid, succinic, glutaric acid, adipic acid, pimelic acid, and suberic acid, as well as hydroxy acids derived therefore such as tartaric acid, and citric acid, and also tetrahydrophthalic acid, hexahydrophthalic acid, hexahydroterephthalic acid, phthalic acid, terephthalic acid, isophthalic acid, sulphoisophthalic acid, any of the isomeric naphthalene dicarboxylic acids, trimellithic acid, trimesic acid, benzene tetracarboxylic acid, benzophenone tetracarboxylic acid, diphenyl dicarboxylic acid, and diphenylsulphone dicarboxylic acid. In those cases where anhydrides of these acid exist, they may of course also be used.

The polyhydric aliphatic alcohols D4 having at least two hydroxyl groups may have from two to ten carbon atoms and are preferably selected from the group consisting of glycerol, trimethylol ethane, trimethylol propane, pentaerythritol, ditrimethylol ethane, ditrimethylol propane, dipentaerythritol, diglycerol, erythritol, threitol, sorbitol, mannitol and other sugar alcohols.

Monohydric alcohols D5 are aliphatic linear or branched or cyclic monohydroxy compounds having from one to twenty carbon atoms, such as methanol, ethanol, the isomeric propanols, butanols, pentanols, hexanol-1,2-ethylhexanol-1, decanol-1, tridecanol-1, and stearyl alcohol.

The choice of monomers or starting products used to make the reactive diluent D has to be made under the proviso that the hydroxyl number of D shall preferably not exceed 5 mg/g.

The urethane alkyd resins A and the esters used as reactive diluents D are made by the commonly used procedures, preferably by removing the water formed during poly-condensation by entrainment agents such as inert gas, or preferably, azeotrope formers to shift the equilibrium towards the product side. Catalysts may also be used, such as alkali hydroxides, or transition metal catalysts. Urethane formation may also be catalysed by the tin, lead, or bismuth catalysts known in the art.

The use of the reactive diluents D leads to lower viscosity during building up the high molar mass alkyd resin by reaction with diisocyanate, penetrates into pores of the substrate (wood) upon application to provide improved wetting and improved sealing of the substrate surface, and is crosslinked jointly with the alkyd resin by drying. The mass fraction of reactive diluent D in the mixture of urethane alkyd resins A and reactive diluent D is preferably from 1% to 50%, particularly preferably from 2% to 45%, and especially preferred, from 3% to 40%. A minimum mass fraction of 5% ensures easy handling of the diluted alkyd resins.

The combinations of a high molar mass urethane-modified alkyd resin A and a reactive diluent D as described in this invention may be applied to any substrate, particularly porous substrates such as wood, both as native and industrial wood, fibreboard, textiles, paper, cardboard, plaster, and leather. As the crosslinking reaction is provided by air drying, there is no need to subject the coated substrates to elevated temperatures. Drying may be accelerated in the usual way by admixing siccatives as known in the art. Depending on the end use, appropriated additives may also be admixed.

EXAMPLES

In the examples, fatty acid mixtures as commercially available from natural sources are designated by such natural source, the amounts of individual fatty acids may vary within the limits stated in reference books; reference is made here to "Fats and Fatty Oils" in "Ullmann's Encyclopedia of Industrial Chemistry", Vol. A10, pages 176 and 177 (1987).

The acid number is defined, according to DIN EN ISO 2114 (DIN 53 402), as the ratio of that mass $m_{KOH}$ of potassium hydroxide which is needed to neutralise the sample under examination, and the mass $m_B$ of this sample, or the mass of the solids in the sample in the case of a solution or dispersion; its customary unit is "mg/g".

The hydroxyl number is defined according to DIN EN ISO 4629 (DIN 53 240) as the ratio of the mass of potassium hydroxide $m_{KOH}$ having the same number of hydroxyl groups as the sample, and the mass $m_B$ of that sample (mass of solids in the sample for solutions or dispersions); the customary unit is "mg/g".

The physical quantity formerly referred to as "limiting viscosity number", properly named "Staudinger-Index" $J_g$ according to DIN 1342, part 2.4, is the limiting value of the Staudinger function $J_v$ for decreasing concentration and shear gradient, wherein $J_v$ stands for the relative change in viscosity divided by the mass concentration $\beta_B = m_B/V$ of the solute B (having a mass $m_B$ of the solute in a volume V of the solution), viz., $J_v = (\eta_r - 1)/\beta_B$. The relative change in viscosity $\eta_r - 1$ is calculated as $\eta_r - 1 = (\eta - \eta_s)/\eta_s$. The relative viscosity $\eta_r$ is the ratio of the viscosity $\eta$ of the solution under consideration, and the viscosity $\eta_s$ of the pure solvent. The physical significance of the Staudinger index is that of a specific hydrodynamic volume of the solvated polymer coils at infinite dilution in the state of rest. The unit generally accepted for J is "cm$^3$/g"; formerly often "dl/g".

Example 1

Grafted Fatty Acids 71 g of linseed oil fatty acids were charged in a reactor and heated to 140° C. A monomer mixture consisting of 55 g of isobutyl methacrylate, 10 g of para-methyl styrene and 35 g of methacrylic acid together with 4 g of di-tert. butyl peroxide was added continuously over eight hours. The mixture was kept at 140° C. thereafter until a conversion to polymer of at least 99% had been reached, as witnessed by the mass fraction of solids. Finally, the reaction mixture was diluted with xylene. The solution had a mass fraction of solids of 85%, and an acid number of 203 mg/g.

Example 2

Reactive Diluent 1

600 g of soy bean oil and 100 g of maleic anhydride were charged to a reactor and heated to 210° C. At this temperature the reaction was continued until no more free maleic anhydride could be detected (via ring opening of maleic acid with KOH, extraction of free maleic acid to the aqueous phase and titration of excess of KOH with HCl). After approximately four hours no more free maleic anhydride could be detected and the whole reaction mixture was cooled to 160° C. Now 500 g of polyethylene glycol 500 monomethyl ether (average molar mass 500 g/mol) were added, and the mixture held at this temperature until a final acid value of approximately 45 mg/g was reached.

Example 3

Comparative—Example 4 from WO 2006/092211 A1

200 g of the grafted fatty acids of Example 1 were charged to a reactor, together with 67 g of trimethylol propane, 15 g of isomerised sunflower oil fatty acids, and 55 g of native sunflower oil fatty acids, and heated to 175° C. The mixture was kept under esterification conditions, i. e. at a constant temperature of 175° C. under removal of water by azeotropic distillation with xylene until an acid number of approximately 75 mg/g had been reached. All solvent was then removed by distillation under reduced pressure. Within thirty minutes, 30 g of isophorone diisocyanate were added at 70° C., the temperature slowly rising due to the exothermic reaction to 100° C. At this temperature, the reaction was continued until a Staudinger index of 8.5 cm$^3$/g had been reached. Additional diisocyanate was added if there was need, when repeating this experiment, care being taken that no residual free isocyanate was left after reaching the desired value of the Staudinger index. Then, the solid resin was emulsified by adding 490 ml of water and 15 g of an aqueous ammonia solution of 25% strength, yielding an aqueous emulsion of the binder with a mass fraction of solids of 40%, a dynamic viscosity measured at 23° C. and a shear rate of 10 s$^{-1}$ of 3800 mPa·s, a mass average particle size of 60 nm, an acid number of 60 mg/g, and a pH of 8.3, measured at 10% strength in water. "Strength", as used in this patent application, is the mass fraction of solute in the solution, i. e. mass of solute divided by mass of solution, or mass fraction of dispersed substance in the dispersion, usually measured in "%", or cg/g.

Example 4

Comparative—High Molar Mass Alkyd Resin Made by a Solvent Process, without Reactive Diluent 200 g of the grafted fatty acids of Example 1 were charged to a reactor, together with 67 g of trimethylol propane, 15 g of isomerised sunflower fatty acids, and 55 g of native sunflower oil fatty acids, and heated to 175° C. The mixture was kept under esterification conditions, i. e. at a constant temperature of 175° C. under removal of water by azeotropic distillation with xylene until an acid number of approximately 75 mg/g had been reached. The content of the reactor was then cooled to 70° C. and diluted with additional xylene to a mass fraction of solids of 85%. Within thirty minutes, 40 g of isophorone diisocyanate were added at 70° C., the temperature slowly rising due to the exothermic reaction to 100° C. At this temperature, the reaction was continued until a Staudinger index of 15 cm$^3$/g had been reached. Additional diisocyanate was added if there was need, when repeating this experiment, care being taken that no residual free isocyanate was left after reaching the desired value of the Staudinger index. Then, the solid resin was emulsified by adding 700 ml of water and 15 g of an aqueous ammonia solution of 25% strength, yielding an aqueous emulsion of the binder. At approximately 80° C., xylene was distilled off azeotropically under reduced pressure. After having collected approximately 150 ml of distillate, the remaining waterborne emulsion was free of aromatic solvent as detected by gas chromatography. The binder achieved in this way had a mass fraction of solids of 35%, a dynamic viscosity measured at 23° C. and a shear rate of 10 s$^{-1}$ of 5200 mPa·s, a mass average particle size of 70 nm, an acid number of 57 mg/g, and a pH of 8.2, measured at 10% strength in water.

Example 5

Urethane Alkyd Resin 1

200 g of the grafted fatty acids of Example 1 were charged to a reactor, together with 67 g of trimethylol propane, 15 g of isomerised sunflower fatty acids, and 55 g of native sunflower oil fatty acids, and heated to 175° C. The mixture was kept under esterification conditions, i. e., at a constant temperature of 175° C. under removal of water by azeotropic distillation with xylene until an acid number of approximately 75 mg/g had been reached. All solvent was then removed by distillation under reduced pressure. The reactor content then was cooled to 70° C. and diluted with 60 g of the reactive diluent of example 2. Within thirty minutes, 40 g of isophorone diisocyanate were added at 70° C., the temperature slowly rising due to the exothermic reaction to 100° C. At this temperature, the reaction was continued until a Staudinger index of 15 cm$^3$/g had been reached. Additional diisocyanate was added if there was need, when repeating this experiment, care being taken that no residual free isocyanate was left after reaching the desired value of the Staudinger index. Then, the solid resin was emulsified by adding 580 ml of water and 18 g of an aqueous ammonia solution of 25% strength, yielding an aqueous emulsion of the binder with a mass fraction of solids of 40%, a dynamic viscosity measured at 23° C. and a shear rate of 10 s$^{-1}$ of 4900 mPa·s, an average particle size of 100 nm, an acid number of 60 mg/g, and a pH of 8.1, measured at 10% strength in water.

Addition of reactive diluent allowed to the same value of the Staudinger index as in Example 4, but without the use of solvent which afterwards had to be removed via azeotropic distillation.

Example 6

Reactive Diluent 2

148 g of phthalic anhydride were charged together with 500 g of polyglycol 500 monomethyl ether (molar mass 500 g/mol) and heated slowly to 140° C. and held for one hour at this temperature. 134 g of trimethylolpropane and 560 g of soy bean oil fatty acids were then added. The mixture was heated to 220° C. and under removal of water by azeotropic distillation with xylene held at this temperature until the acid value was below 4 mg/g. Xylene was then removed by distillation under reduced pressure. The final product had a mass fraction of solids of 99.5%.

Example 7

Testing of Stains

Stains have been prepared from the binders of examples 3, 4, and 5, according to the formulations given in table 1:

TABLE 1

| Formulations (masses of constituents) | | | |
|---|---|---|---|
| | Stain 7.3 | Stain 7.4 | Stain 7.5 |
| binder of Example | 3 | 4 | 5 |
| binder | 222 g | 254 g | 222 g |
| water | 32 g | 0 g | 32 g |
| Siccative [1] | 1.9 g | 1.9 g | 1.9 g |
| Dispersing Agent [2] | 5.5 g | 5.5 g | 5.5 g |
| Antiskinning Agent [3] | 1.7 g | 1.7 g | 1.7 g |
| Antifoaming Agent [4] | 0.8 g | 0.8 g | 0.8 g |
| Biocide [5] | 4.0 g | 4.0 g | 4.0 g |
| Thickener [6] | 1.5 g | 1.5 g | 1.5 g |
| Colour Pigment [7] | 8.6 g | 8.6 g | 8.6 g |
| Water | 170 g | 170 g | 170 g |

Legend:
[1] combination siccative (Co, Li, Zr) free of nonylphenol ethoxylates, water-emulsifiable
[2] natural oil partially saponified with phosphoric acid
[3] oxime-based anti-skinning agent
[4] silicone-modified defoamer
[5] benzimidazole derivative and octylisothiazolinone
[6] non-ionic urethane rheology modifier
[7] organic yellow nickel pigment (Pigment Yellow 153)

Characteristics of the stains, method of application and performance are compiled in table 2.

TABLE 2

| | Stain Testing | | |
|---|---|---|---|
| | Stain 7.3 | Stain 7.4 | Stain 7.5 |
| Mass Fraction of Solids | 20% | 20% | 20% |
| Application on Spruce | 2 coats | 2 coats | 2 coats |
| Visual Inspection (1 a) [8] | Completely Cracked | Slightly Cracked | No Cracks |

[8] after one year of outdoor exposure, inspection of coating film on the surface As can be seen, stain 7.5 with the binder of example 5 (according to the invention) has the best performance in outdoor weathering. It also has the highest mass fraction of solids in the binder (40%) at acceptable viscosity. The binder of example 4 (with the same Staudinger index as in example 5 according to the invention, xylene as solvent during the urethane synthesis, afterwards removed) can only be formulated to a mass fraction of solids of 35%, and still has a higher viscosity in the dispersion. Without adding of a solvent, it is not possible to reach the high value of the Staudinger index (example 3, according to WO 2006/092 211). The good results of the test for example 5 are therefore due to both the effect of the higher molar mass of the binder resin (as shown in the Staudinger index) and also the fact that the reactive diluent is co-crosslinked during the air drying process.

The invention claimed is:

1. An aqueous coating composition comprising a combination of a high molar mass urethane-modified alkyd resin A and a reactive diluent D, characterised in that the alkyd resin A has moieties derived from
    grafted fatty acids A1 which are graft products of fatty acids A11 having at least one olefinic unsaturation, on average, per molecule, and olefinically unsaturated linear or branched aliphatic acids A12, and
    at least one of polyhydric aliphatic alcohols A2, and transesterification products of polyhydric aliphatic alcohols A2 with natural oils A6, and
    fatty acids A3, and
    polyfunctional isocyanates A4,
and the reactive diluent D has a hydroxyl number of at most 5 mg/g, and comprises moieties derived from
    olefinically unsaturated fatty acids D1 which may optionally be grafted with olefinically unsaturated monomers D11 including at least one of an olefinically unsaturated monocarboxylic acid D111.

2. The aqueous coating composition of claim 1 wherein the alkyd resin A has also moieties derived from polybasic organic acids A5.

3. The aqueous coating composition of claim 1 wherein the reactive diluent D further comprises moieties derived from aliphatic or aromatic di- or polycarboxylic acids D3 or their anhydrides.

4. The aqueous coating composition of claim 1 wherein the reactive diluent D further comprises moieties derived from polyhydric aliphatic alcohols D4 having at least two hydroxyl groups.

5. The aqueous coating composition of claim 1 wherein the reactive diluent D is an ester made from fatty acids D1 and aliphatic linear or branched alcohols, which is then grafted with olefinically unsaturated dicarboxylic acid anhydrides, followed by ring-opening with water or aliphatic alcohols having at least one hydroxyl group per molecule.

6. A process to make an aqueous coating composition comprising combining a high molar mass urethane-modified alkyd resin A and a reactive diluent D, wherein the alkyd resin A has moieties derived from
    grafted fatty acids A1 which are graft products of fatty acids A11 having at least one olefinic unsaturation, on average, per molecule, and olefinically unsaturated linear or branched aliphatic acids A12, and
    at least one of polyhydric aliphatic alcohols A2, and transesterification products of polyhydric aliphatic alcohols A2 with natural oils A6, and
    fatty acids A3, and
    polyfunctional isocyanates A4
and the reactive diluent D has a hydroxyl number of at most 5 mg/g, and comprises moieties derived from olefinically unsaturated fatty acids D1,
the said coating composition being is made by a stepwise process comprising,
    in the first step, grafting fatty acids A11 having at least one olefinic unsaturation, on average, per molecule, with olefinically unsaturated linear or branched aliphatic acids A12, to obtain grafted fatty acids A1,
    in the second step, subjecting the grafted fatty acids A1 of the first step to an esterification reaction together with at least one of polyhydric aliphatic alcohols A2, transesterification products of polyhydric aliphatic alcohols A2 with natural oils A6, and fatty acids A3, to obtain an alkyd resin A, and
    in the third step, mixing the alkyd resin A made in the second step with a reactive diluent D which is made in a separate step by esterification of olefinically unsaturated fatty acids D1 or of drying oils which are esters of these fatty acids, and polyoxy-alkylene glycols D2 or their monoethers, and reacting this mixture thus obtained
    in the fourth step, with polyfunctional isocyanates A4.

7. The process of claim 6 wherein in the third step, aliphatic or aromatic di- or polycarboxylic acids D3 or their anhydrides are also present in the reaction mixture.

8. The process of claim 6 wherein in the third step, polyhydric aliphatic alcohols D4 having at least two hydroxyl groups are also present in the reaction mixture.

9. A method of use of the aqueous coating composition comprising a combination of a high molar mass urethane-modified alkyd resin A and a reactive diluent D as claimed in claim 1, comprising adding a siccative S, and applying the aqueous coating composition including the added siccative S to a substrate.

10. The method of claim 9 wherein at least one of additives selected from the group consisting of dispersing agents, flow and levelling agents, wetting agents, antisettling agents, biocides, UV absorbers, pigments, and fillers are added to the aqueous coating composition.

11. The aqueous coating composition of claim 1 wherein said olefinically unsaturated linear or branched aliphatic acids A12 have from three to ten carbon atoms.

12. The aqueous coating composition of claim 5, wherein said olefinically unsaturated dicarboxylic acid anhydrides are maleic or tetrahydrophthalic acids.

13. The process of claim 6 wherein said olefinically unsaturated linear or branched aliphatic acids A12 have from three to ten carbon atoms.

14. The process of claim 7, wherein in the third step, polyhydric aliphatic alcohols D4 having at least two hydroxyl groups are also present in the reaction mixture.

15. The method of claim 9, wherein said substrate is wood, both as native and industrial wood, fibreboard, textiles, paper, cardboard, leather, or a thermoplastic material.

* * * * *